3,314,913
HEXOSE POLYTHIOMERCAPTAL ADHESIVES

Archie J. Deutschman, Jr., and James W. Berry, Tucson, Ariz., assignors to the United States of America as represented by the Secretary of Agriculture
No Drawing. Filed Jan. 18, 1965, Ser. No. 426,456
4 Claims. (Cl. 260—30.8)

A nonexclusive, irrevocable, royalty-free license in the invention herein described, throughout the world for all purposes of the United States Government, with the power to grant sublicenses for such purposes, is hereby granted to the Government of the United States of America.

This invention relates to a novel class of polymeric mercaptals and more specifically to novel linear polythioacetals formed by acid catalyzed condensations of difunctional mercaptans with sugars such as glucose, fructose, mannose, galactose, and xylose.

Several prior art classes of polymercaptals are known. For example, Fisher et al., U.S. Patent 2,389,662, produced linear polymers containing spiro linkages by condensing a bifunctional dithiol such as tetrakis (mercapto methyl) methane with dicarbonyl compounds such as aliphatic diketones, aromatic diketones, and alicyclic diketones such as 1,4-cyclohexanedione. Also, Marvel et al., J. Chem. Soc. 72:2106 (1950) formed linear polymers by condensing dithiols with aliphatic and aromatic aldehydes. Sugar mercaptals obtained by reacting hexoses with simple monofunctional mercaptans are also old, but they have no utility and are merely nonpolymeric laboratory curiosities.

One object of our invention is the preparation of a useful and novel class of sugar polythiomercaptals by carefully catalyzed reactions of simple sugars with difunctional mercaptans. Another object is the controlled preparation of a novel class of relatively low molecular weight linear polythiomercaptals from inexpensive carbohydrates, freshly acidified organic solvent solutions of which uncured polythiomercaptals may be applied as self-curing adhesives for surfaces, glass, wood, or other materials. Our novel polythiomercaptals in an acidic environment then crosslink at ambient temperatures to provide exceptionally strong unions that are waterproof and generally insoluble. Furthermore, the low strengths that are found when most adhesives are amateurishly applied as merely thick coats are not present with our polymers. For example, when 2½ in. by ¾ in. wooden blocks that had been cemented together with about a 1/16 in. final layer of uncured sugar polythiomercaptal polymers were mechanically subjected to gradually increased tensile forces, the wood itself finally tore apart, leaving the thick layer of resinous crosslinked polythioacetal completely intact. Another object is the formation of linear polythiomercaptal intermediates that in N-methyl pyrrolidone solutions can be oxidized by peroxypropionic acid to the corresponding sulfone derivatives that are soluble in still fewer polar solvents than the parent polymer or that can be fully acetylated by acetic anhydride to more widely soluble polymers whose repeating units correspond to the following empirical formula, $C_{26}H_{42}O_{10}S_2$. Other objects and advantages will be apparent hereinafter.

In accordance with the above indicated objects we have now discovered that novel polymeric thiomercaptals of glucose, mannose, and other hexoses can be obtained under rather critical conditions of acid catalysis and of temperature and that neutralization-stabilized organic solvent solutions of the obtained linear polythiomercaptals rapidly crosslink under mildly acidic conditions to provide exceptionally strong bonding of wood, glass, etc.

Our novel sugar polymercaptals have been prepared by solution polymerization at temperatures between about 15° to about −35° C. in anhydrous dioxane solutions containing from about 25 to about 60 percent in the dioxane of a halogen acid catalyst, preferably hydrofluoric acid, to give colorless powders whose inherent viscosities in N-methyl-2-pyrrolidone at 30° C. range from 0.03 to 0.24, the polythiomercaptals of the shorter chain dithiols being soluble or partially soluble in certain polar solvents whereas those formed with the longer chain dithiols dissolve in only very few solvents. The structure is shown in the following equation:

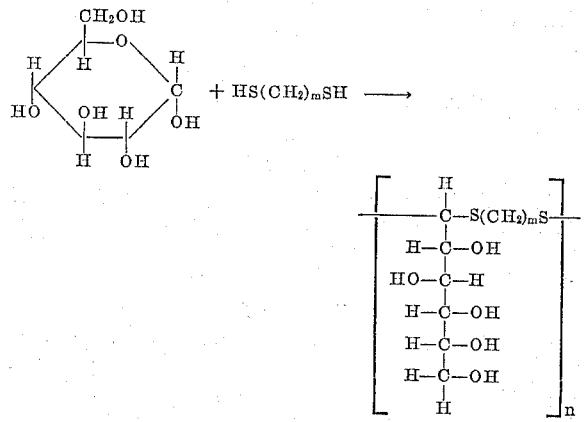

wherein $m$ is an integer having a value of 5 through 10 and the value of $n$ is defined by the average molecular weight inherent in intrinsic viscosities at 30° C. in N-methyl-2-pyrrolidone of 0.02 to 0.24.

The following detailed examples will more precisely illustrate our invention, it being understood that although the examples emphasize solutions of hydrogen fluoride catalyst and dioxane as the solvent, we also used the lower alkanoic acids including acetic and butyric acids as solvents for the reaction and liquid hydrogen fluoride alone as both reaction solvent and catalyst. As catalysts we also tried boron trifluoride etherate, hydrochloric acid, anhydrous hydrogen chloride, trichloroacetic acid, and 70-percent perchloric acid, but these latter catalysts markedly limited the temperature that could be employed for the desired polymerization reaction to about 0° C. or less, whereas with HF a temperature of about 13° C. is optimal.

Example 1

Powdered, dried glucose (1.35 g.; 0.0075 mole) was placed in a 2-oz. wide-mouth polyethylene jar containing a Teflon-coated magnetic bar. Then 1.65 ml. (1.54 g.; 0.0075 mole) of 1,10-decanedithol was added followed by the addition of 8 ml. of a freshly made 27-percent stock solution of anhydrous hydrogen fluoride in anhydrous peroxide-free dioxane. The tightly capped reaction jar was then maintained at a temperature of 13° C. ±1° for 28 hours with magnetic stirring. Following dilution with 20 ml. of dioxane and stirring for 15 minutes at room temperature, the diluted material was made slightly basic by the careful addition of 5-percent $K_2CO_3$ solution, thereby completely terminating the polymerization reaction. Following removal of unreacted dimercaptan with petroleum ether, the precipitated polymer obtained by filtration was washed with water and stirred in 100 ml. of methanol for 15 minutes to provide a fine dispersion. Then it was refiltered, washed with fresh methanol and with petroleum ether to remove last traces of monomer, low molecular weight polymer, and cyclic impurities, and finally dried under vacuum. The colorless polymer melting at 102–110° C. represented a 69 percent by weight yield (thiol conversion by titration, 84 percent). Analysis. Calc'd for $C_{16}H_{32}S_2$: C, 52.14; H, 8.75; S, 17.40. Found: C, 52.40; H, 8.83; S, 17.56. A 10 percent solution of the polythioacetal, i.e., glucose decyl dimercapatal polymer in the dimethylsulfoxide was made acidic with HCl and the solution was applied to the mutually adjacent surfaces of sawed wooden blocks. After being clamped at room temperature for several hours to permit curing of the polythioacetal, the ends of the thusly cemented blocks were subjected by hydraulic means to gradually increased tension. The blocks themselves finally came apart, the cemented joints remaining intact, thus showing that the cured polythioacetal adhesive is stronger than the wood itself.

The uncured linear polymer was previously found to be soluble in DMSO and in hexamethyl phosphoramide, partially soluble in DMF, cresol, N-methyl-2-pyrrolidone, and pyridine, and insoluble in acetone, benzene, $CCl_4$, dioxane, 95-percent ethanol, ethyl acetate, 50-percent KOH, water, and tetrahydrofurnan. Its inherent viscosity in N-methyl-2-pyrrolidene at 30° was 0.19.

*Example 2*

Example 1 was repeated excepting that 0.0075 mole of 1,9-nonanedithiol was substituted for the 1,10-decanedithiol. The polymer (68% yield) melted at 110–133° C. and had an inherent viscosity of 0.13.

*Example 3*

Example 1 was repeated excepting that 0.0075 mole of 1,8-octanedithiol was substituted for the 1,10-decanedithiol. The polymercaptal (64% yield) melted at 105–130° C. and had an inherent viscosity of 0.12.

*Example 4*

Example 1 was repeated excepting that 0.0075 mole of 1,6-hexanedithiol was substituted for the 1,10-decanedithiol, and the polymer was precipitated with 100 ml. of methanol followed by neutralization with 5-percent $K_2CO_3$ solution. The polymercapatal, melting at 83–133° C., had an inherent viscosity of 0.12.

*Example 5*

Example 1 was repeated excepting that 1,5-pentane dithiol was substituted for the 1,10-decanedithiol, and the polymer was precipitated with 100 ml. of methanol followed by neutralization with 5-percent $K_2CO_3$ solution. The polymer (44% yield), melted at 80–126° C., had an inherent viscosity of 0.10. Unlike the decanedithiol polymer, the shorter chain polymercaptal was also soluble in DMF, N-methyl-2-pyrrolidone, and pyridine and partially soluble in 50-percent KOH and in water. The polymercaptal was not subjected to crosslinking.

*Example 6*

Example 1 was repeated excepting that fructose was substituted for the glucose. The polymercaptal melted at 63–81° C. and had an inherent viscosity of 0.24.

*Example 7*

Example 1 was repeated excepting that mannose was substituted for the glucose. The polymercaptal, obtained in a yield of 76 percent, melted at 145–149° C. and had an intrisinc viscosity of 0.16.

*Example 8*

Example 1 was repeated excepting that xylose was substituted for the glucose. A 71-percent yield of the polymercaptal was obtained. It melted at 82–107° C. and had an intrinsic viscosity of 0.16.

*Example 9*

Glucose 2.25 g. (0.0125 mole) and 2 ml. concentrated HCl (37%) were stirred until homogenous. Then 4.2 ml. (0.025 mole) of ethylclyclohexyl mercaptan was added and the mixture stirred for about 20 minutes to produce a stable monomeric mercaptal system. Then another 2.25 g. of glucose was added and stirred for about 5 minutes to produce the polymercaptal, thusly avoiding a second addition of the acid catalyst. A dimethylsulfoxide solution of linear polymercaptal was then applied as an adhesive to wood blocks. After 24 hours of curing at 25° C., the blocks were subjected to tension. The glue line remained intact whereas the wood itself broke.

*Example 10*

Example 1 was repeated excepting that 33 ml. of a 22-percent solution of HF in dioxane was substituted for the 27-percent HF catalyst solution of Example 1, the temperature was held at 12° C., and the reaction was conducted for 26 hours. The obtained linear copolymer representing a 40-percent conversion of the dithiol melted at 70–81° C. and had an inherent viscosity at 30° C. in N-methyl-2-pyrrolidone of 0.07.

*Example 11*

Example 1 was repeated excepting that 42 ml. of a 31-percent solution of HF in dioxane was employed as catalyst, the temperature was maintained at 6° C., and the reaction was conducted for 15 hours. The obtained linear polymer, representing an 81 percent conversion of the dithiol, melted at 118–134° C. and had an intrinsic viscosity under the defined conditions of 0.14.

We claim:

1. A stable dimethyl sulfoxide solution of a linear hexose dimercaptal polymer having the structure:

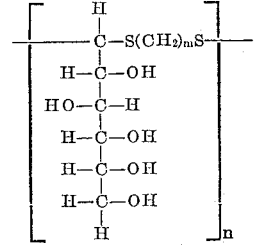

wherein $m$ is an integer of value 5–10 inclusive and the value of $n$ is derived from the molecular weights inherent in intrinsic viscosities of 0.02–0.24 in N-methyl-2-pyrrolidone at 30° C., said linear polymer being free of acidic contaminants.

2. A method of permanently bonding wooden surfaces comprising acidifying a solution as defined in claim 1, promptly applying said acidified solution to the surfaces to be bonded, and permitting the applied acid-activated linear dimercaptal polymer to cure at room temperature.

3. A process for preparing the linear hexose mercaptal polymers of claim 1 comprising reacting for about 28 hours at 0° C. to not above 13° C. a hexose selected from the group consisting of glucose, fructose, mannose, galactose, and xylose and a difunctional mercaptan selected from the $C_5$–$C_{10}$ alkyl dithiols in the presence of a solvent-catalyst member selected from the group consisting of liquid hydrogen fluoride, concentrated hydrochloric acid, anhydrous HCl, and a peroxide-free dioxane solution containing up to about 27 percent of anhydrous hydrogen fluoride, neutralizing the reaction mixture to terminate the reaction, extracting unreacted mercaptan with petroleum ether and isolating the linear polymer in pure form by washing successively with water, methanol, and petroleum ether.

4. The process of claim 3 wherein the hexose is glucose, the difunctional mercaptan is 1,10-decanedithiol, the solvent-catalyst is dioxane containing 27 percent of anhydrous hydrogen fluoride, and the reaction temperature is 13° C.

References Cited by the Examiner

UNITED STATES PATENTS

| | | | |
|---|---|---|---|
| 2,387,275 | 10/1945 | Leuck | 260—9 |
| 2,676,165 | 4/1954 | Fettes | 260—79 |
| 2,842,582 | 7/1958 | Jenner | 260—79 |

MORRIS LIEBMAN, Primary Examiner.

L. T. JACOBS, Assistant Examiner.